UNITED STATES PATENT OFFICE.

RUDOLPH BERENDES, OF ELBERFELD, GERMANY, ASSIGNOR TO FARBENFABRIKEN VORM. FRIEDR. BAYER & CO., OF ELBERFELD, GERMANY, A CORPORATION OF GERMANY.

CREOSOTE COMPOUND.

No. 824,901.  Specification of Letters Patent.  Patented July 3, 1906.

Application filed March 31, 1906. Serial No. 309,097.

*To all whom it may concern:*

Be it known that I, RUDOLPH BERENDES, doctor of philosophy, chemist, a citizen of the German Empire, residing at Elberfeld, Kingdom of Prussia, Germany, have invented new and useful Improvements in New Creosote Compounds, of which the following is a specification.

In another application for Letters Patent, being Serial No. 309,096, also filed March 31, 1906, I have described the production of new pharmaceutical products which are chemically alkyloxy-acetyl compounds of pyrocatechinmonoalkylethers. I have now found that creosote can also be converted into alkyloxy-acetyl compounds and that according to my researches the resulting products likewise possess valuable therapeutic properties, especially for the treatment of tuberculosis, and the absence of any odor, their freedom from irritation, non-toxicity, and ability of being easily reabsorbed render their outward application highly satisfactory, an average dose being between from one to three grams for one external application.

The process for producing the new compounds consists in treating creosote with alkyloxy-acetic acid or derivatives thereof—such as ethoxy or methoxy acetic acid, ethoxyacetyl chlorid, or the like—in such manner as to produce esterification. The new products thus produced are colorless liquids, soluble in alcohol and ether. When reacted upon by dilute caustic alkalies, they are split up into creosote and alkyloxy-acetic acid. Creosote being, as is known, a mixture of different phenols, mainly guaiacol, creosol, and cresol, by the term "alkyloxy-acetyl compounds of creosote" I mean a mixture of the alkyloxy-acetyl compounds of the phenols of which creosote consists.

In carrying out my process practically I can proceed as follows, the parts being by weight: One hundred and thirty-eight parts of creosote and forty parts of caustic soda are dissolved in one thousand parts of water and to the resulting solution one hundred and twenty-two and one-half parts of ethoxyacetyl chlorid are added. After the chlorid has entered into reaction the mixture is shaken with ether, which will extract the new ester. The ethereal solution is then separated from the water, shaken with highly-dilute caustic soda to remove unchanged creosote, and dried. The ether is driven off and the residue is distilled *in vacuo*.

The ethoxy-acetyl compound of creosote is a limpid oil which boils at from 152° to 176° centigrade under a pressure of about twenty millimeters. It is easily soluble in alcohol and ether and is split up into ethoxy-acetic acid and creosote when reacted upon by dilute caustic alkalies.

Having now described my invention and in what manner the same is to be performed, what I claim as new, and desire to secure by Letters Patent, is—

1. The herein-described new alkyloxy-acetyl compounds of creosote, obtainable by the action of alkyloxy-acetyl chlorid on creosote, being colorless liquids soluble in ether and alcohol; liberating creosote when reacted upon by dilute caustic alkalies and exhibiting valuable therapeutic properties, substantially as hereinbefore described.

2. The herein-described new ethoxy-acetyl compound of creosote, obtainable by the action of ethoxy-acetyl chlorid on creosote being a limpid colorless oil boiling at from 152° to 176° centigrade under a pressure of about twenty millimeters; being soluble in alcohol and ether; being split up into creosote and ethoxy-acetic acid when reacted upon by dilute caustic alkalies; and exhibiting valuable therapeutic properties, substantially as hereinbefore described.

In testimony whereof I have hereunto set my hand in the presence of two subscribing witnesses.

RUDOLPH BERENDES.

Witnesses:
  OTTO KÖNIG,
  ARTHUR MATTHÄUS.